(No Model.)
J. W. BATCHELLER.
BORING TOOL.
No. 508,803. Patented Nov. 14, 1893.
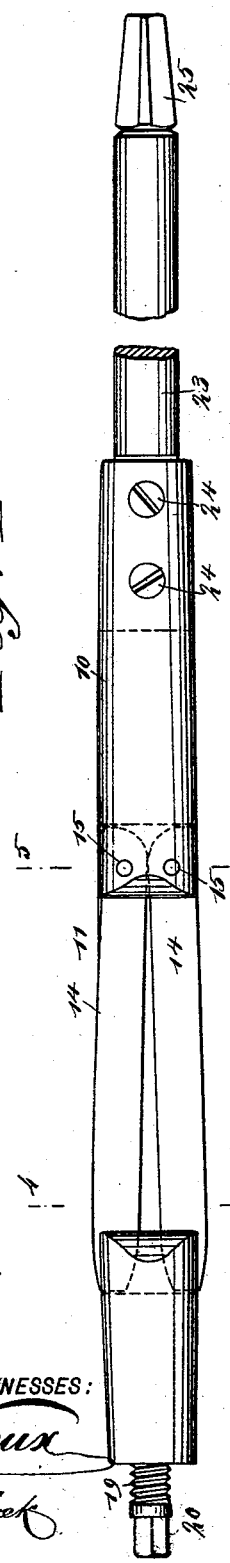
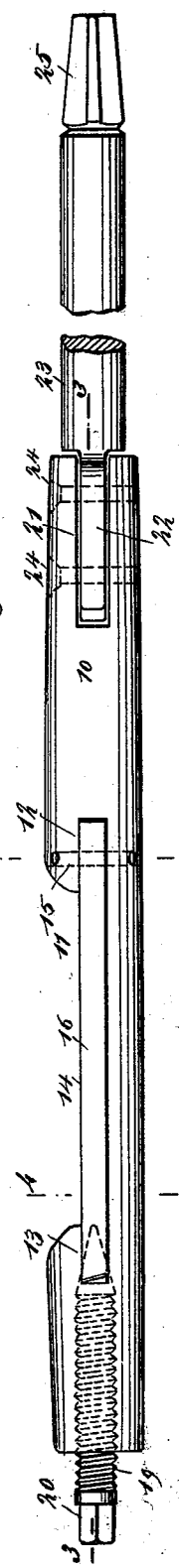
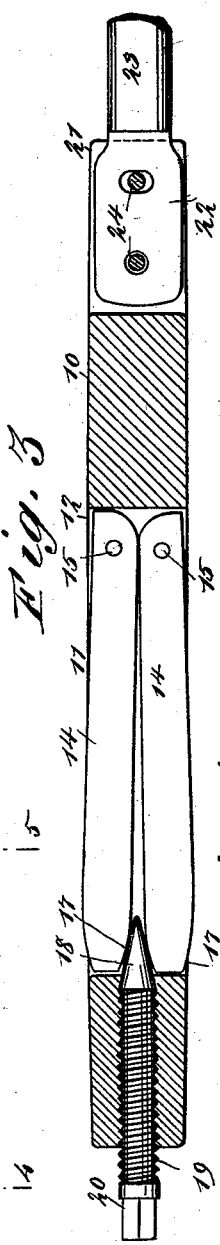
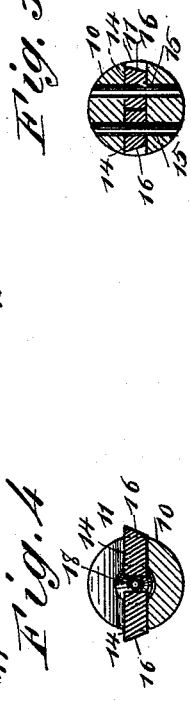
WITNESSES:
C. Neveux
C. Sedgwick
INVENTOR
J. W. Batcheller
BY Munn & Co.
ATTORNEYS.

UNITED STATES PATENT OFFICE.

JOSIAH W. BATCHELLER, OF ST. JOSEPH, MISSOURI.

BORING-TOOL.

SPECIFICATION forming part of Letters Patent No. 508,803, dated November 14, 1893.

Application filed June 13, 1893. Serial No. 477,449. (No model.)

*To all whom it may concern:*

Be it known that I, JOSIAH W. BATCHELLER, of St. Joseph, in the county of Buchanan and State of Missouri, have invented a new and Improved Boring-Tool, of which the following is a full, clear, and exact description.

My invention relates to improvements in boring tools and especially to that class of tools which are used for enlarging and smoothing bores already made, such as the bores of gun barrels.

The object of my invention is to produce a very simple, strong and convenient tool which may be readily applied to a gun barrel, which bores out the same by turning out a shaving instead of scraping the walls of the barrel, and which may be conveniently used for choking the barrel.

A further object of my invention is to produce a tool which may be conveniently operated by a machine or by an ordinary hand brace.

To these ends my invention consists of a boring tool the construction of which will be hereinafter described and claimed.

Reference is to be had to the accompanying drawings forming a part of this specification, in which similar figures of reference indicate corresponding parts in all the views.

Figure 1 is a broken plan view of the tool embodying my invention. Fig. 2 is a broken side elevation of the tool. Fig. 3 is a longitudinal section of the same. Fig. 4 is a cross section on the lines 4—4 in Figs. 1 and 2; and Fig. 5 is a cross section on the lines 5—5 in Figs. 1 and 2.

The tool is provided with a stock 10, which is preferably of a generally cylindrical shape and which may be made of a size to readily enter a gun barrel. The stock 10 is recessed on one side, as shown at 11, and is slotted transversely at the ends of the recess, as shown at 12 and 13. In the recess 11 are the boring blades or bits 14, which are made of steel and which, at one end, enter the slot 12 in which they are independently pivoted, as shown at 15, the pivots consisting of rivets extending through the stock 10, and the free ends of the blades are adapted to swing into the slot 13, so that both ends of the blades are rigidly held and the blades are very strong. By recessing the stock on one side and pivoting the blades therein, the cuttings or shavings will be held in the said recess while the tool is at work and withdrawn when the tool is withdrawn. The blades are beveled on their outer edges, as shown at 16, so that they may be ground to a cutting edge, and the free ends of the blades are rounded, as shown at 17, and may be separated by the conical end 18 of a screw 19 which is threaded in one end of the stock 10 and which has a squared outer end 20 to which a wrench may be applied to turn the screw. This construction enables the blades to be forced outward and held outward so that their cutting edges come into effective contact with the wall to be cut.

The stock 10 is slotted transversely at its opposite end, as shown at 21, and in this slot is fitted the flattened and reduced end 22 of the rod 23, which is long enough to extend through the barrel to be bored, and which is secured to the stock by screws 24 which project through the stock and flattened end, the holes in the latter being large enough to permit the movement of the rod 23 in relation to the stock, so that when the rod is turned there will be no danger of transmitting the vibrating or lateral motion to the stock.

The rod 23 has its outer end squared, as shown at 25, to receive a wrench, brace, or similar thing, by which the rod and stock are turned. When the tool is used it is simply inserted in the gun barrel to be bored, the screw 19 is turned so as to force the blades 14 outward to the desired distance, after which the rod 23 and stock 10 are turned and the stock advances as fast as is necessary, so that the blades 14 will bore out the barrel to the desired degree.

It will be seen that this tool is very simple and strong, that it may be very cheaply made, and that it is easily applied to and adjusted in the barrel.

Having thus described my invention, I claim as new and desire to secure by Letters Patent—

1. A boring tool, comprising an elongated stock having an open recess at one side, separable blades pivoted in the recess of the stock, and a screw threaded in the stock and arranged to separate the blades, substantially as described.

2. A boring tool, comprising an elongated stock having an open recess at one side and slotted transversely at the ends of the recess, separable blades pivoted in one of the slots and adapted to swing into the other, and a screw threaded in the stock and adapted to enter between and separate the blades, substantially as described.

3. A boring tool, comprising a stock having an open recess at one side and slotted at one end, blades pivoted in the said recess, a screw threaded in the stock and adapted to enter between the blades and separate them, and a turning rod having a flattened end loosely secured in the slotted end of the stock, substantially as described.

JOSIAH W. BATCHELLER.

Witnesses:
F. T. CONRAD,
CLAUDE L. HUTCHISON.